United States Patent
Liu et al.

(10) Patent No.: US 12,513,590 B2
(45) Date of Patent: Dec. 30, 2025

(54) METHOD FOR CONFIGURING AND OBTAINING SECONDARY CELL GROUP INFORMATION, AND COMMUNICATIONS DEVICE

(71) Applicant: VIVO MOBILE COMMUNICATION CO., LTD., Dongguan (CN)

(72) Inventors: Xuanbing Liu, Dongguan (CN); Xiaodong Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 350 days.

(21) Appl. No.: 18/139,933

(22) Filed: Apr. 26, 2023

(65) Prior Publication Data
US 2024/0080742 A1 Mar. 7, 2024

Related U.S. Application Data

(63) Continuation of application No. PCT/CN2021/127280, filed on Oct. 29, 2021.

(30) Foreign Application Priority Data

Oct. 29, 2020 (CN) .......................... 202011181624.X

(51) Int. Cl.
*H04W 76/27* (2018.01)
*H04W 36/00* (2009.01)
*H04W 36/36* (2009.01)

(52) U.S. Cl.
CPC ..... *H04W 36/362* (2023.05); *H04W 36/0061* (2013.01); *H04W 36/00837* (2018.08)

(58) Field of Classification Search
CPC ............. H04W 36/0061; H04W 76/27; H04W 36/00837; H04W 36/0058; H04W 36/0033; H04W 38/00838; H04W 36/362
See application file for complete search history.

(56) References Cited

U.S. PATENT DOCUMENTS

| 2020/0196205 A1 | 6/2020 | Kim |
| 2023/0117911 A1* | 4/2023 | Wang ................. H04W 36/362 370/331 |
| 2023/0345315 A1* | 10/2023 | Wu ..................... H04W 36/362 |

FOREIGN PATENT DOCUMENTS

| CN | 105120475 A | 12/2015 |
| CN | 107889172 A | 4/2018 |

(Continued)

OTHER PUBLICATIONS

First Office Action issued in related Chinese Application No. 202011181624.X, mailed Jan. 12, 2024, 7 pages.

(Continued)

*Primary Examiner* — Anez C Ebrahim
(74) *Attorney, Agent, or Firm* — IPX PLLC

(57) ABSTRACT

A method for configuring and obtaining secondary cell group information, and a communications device are provided. The method includes: obtaining conditional configuration information of a secondary cell group, where the conditional configuration information of the secondary cell group includes configuration information used for a terminal to add or change a primary secondary cell; and performing a first operation based on the conditional configuration information of the secondary cell group, where the first operation includes an operation of adding the primary secondary cell, or the first operation includes the operation of adding the primary secondary cell and an operation of changing the primary secondary cell.

20 Claims, 4 Drawing Sheets

(56) References Cited

FOREIGN PATENT DOCUMENTS

| | | | |
|---|---|---|---|
| CN | 110198550 | A | 9/2019 |
| CN | 110545567 | A | 12/2019 |
| CN | 110636539 | A | 12/2019 |
| CN | 111837438 | A | 10/2020 |
| WO | 2019160281 | A1 | 8/2019 |
| WO | 2020089700 | A1 | 5/2020 |
| WO | 2020128848 | A1 | 6/2020 |

OTHER PUBLICATIONS

Vivo, "Text proposal for conditional PSCell addition and change", 3GPP tsg_ran\wg2_rl2, R2-1912344, Oct. 2019, 15 pages.
InterDigital, "Conditional PSCell addition/change" 3GPP tsg_ran\wg2_rl2, R2-1912882, Oct. 2019, 3 pages.
International Search Report issued in corresponding International Application No. PCT/CN2021/127280, mailed Dec. 28, 2021, 4 pages.

* cited by examiner

METHOD FOR CONFIGURING AND OBTAINING SECONDARY CELL GROUP INFORMATION, AND COMMUNICATIONS DEVICE

CROSS-REFERENCE TO RELATED APPLICATIONS

This application is a continuation of International Application No. PCT/CN2021/127280, filed Oct. 29, 2021, which claims priority to Chinese Patent Application No. 202011181624.X, filed Oct. 29, 2020. The entire contents of each of the above-referenced applications are expressly incorporated herein by reference.

TECHNICAL FIELD

The present application relates to the field of communications technologies, and in particular, to a method for configuring and obtaining secondary cell group information, and a communications device.

BACKGROUND

In the related art, Intra secondary node Conditional PSCell Change (CPC) is supported. After meeting an execution condition of condition change of a primary secondary cell, User Equipment (UE) changes the primary secondary cell, and when successfully finishing a change process of the primary secondary cell, the UE releases all stored CPC configurations. However, in this solution, the signaling load is relatively heavy when a secondary cell group is changed frequently in the network.

SUMMARY

Embodiments of this application provide a method for configuring and obtaining secondary cell group information, and a communications device.

According to a first aspect, a method for obtaining secondary cell group information is provided, where the method is performed by a terminal and includes:
  obtaining conditional configuration information of a secondary cell group, where the conditional configuration information of the secondary cell group refers to configuration information used for the terminal to add and change a primary secondary cell; and
  performing a first operation based on the conditional configuration information of the secondary cell group, where
  the first operation includes an operation of adding the primary secondary cell, or the first operation includes the operation of adding the primary secondary cell and an operation of changing the primary secondary cell.

According to a second aspect, a method for configuring secondary cell group information is provided, where the method is performed by a network side device and includes:
  sending conditional configuration information of a secondary cell group, where the conditional configuration information of the secondary cell group refers to configuration information used for a terminal to add and change a primary secondary cell.

According to a third aspect, an apparatus for obtaining secondary cell group information is provided, where the apparatus includes:
  a first obtaining module, configured to obtain conditional configuration information of a secondary cell group, where the conditional configuration information of the secondary cell group refers to configuration information used for a terminal to add and change a primary secondary cell; and
  a first processing module, configured to perform a first operation based on the conditional configuration information of the secondary cell group, where
  the first operation includes an operation of adding the primary secondary cell, or the first operation includes the operation of adding the primary secondary cell and an operation of changing the primary secondary cell.

According to a fourth aspect, an apparatus for configuring secondary cell group information is provided, where the apparatus includes:
  a transmitting module, configured to send conditional configuration information of a secondary cell group, where the conditional configuration information of the secondary cell group refers to configuration information used for a terminal to add and change a primary secondary cell.

According to a fifth aspect, a terminal is provided, where the terminal includes a processor, a memory, and a program or an instruction that is stored in the memory and that can run on the processor, and when the program or the instruction is executed by the processor, steps of the method according to the first aspect are implemented.

According to a sixth aspect, a network side device is provided, where the network side device includes a processor, a memory, and a program or an instruction that is stored in the memory and that can run on the processor, and when the program or the instruction is executed by the processor, steps of the method according to the second aspect are implemented.

According to a seventh aspect, a readable storage medium is provided, where the readable storage medium stores a program or an instruction, and when the program or the instruction is executed by a processor, steps of the method according to the first aspect are implemented, or steps of the method according to the second aspect are implemented.

According to an eighth aspect, a chip is provided. The chip includes a processor and a communications interface, the communications interface is coupled to the processor, and the processor is configured to run a program or an instruction, to implement steps of the method according to the first aspect, or steps of the method according to the second aspect.

According to a ninth aspect, a computer program product is provided. The computer program product is stored in a non-volatile storage medium, and the computer program product is executed by at least one processor to implement the method according to the first aspect or the method according to the second aspect.

In the embodiments of this application, the conditional configuration information of the secondary cell group refers to the configuration information used for the terminal to add and change the primary secondary cell, that is, the conditional configuration information is a condition configuration supporting both primary secondary cell adding and primary secondary cell change. Therefore, due to the conditional configuration information, the maintenance burden of frequently changing the secondary cell group information in the network can be reduced, the signaling load can be reduced, the delay of the UE in performing the process of adding the primary secondary cell and the process of chang-

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that, data used in this way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and the character "/" generally represents an "or" relationship between associated objects.

It should be noted that the technology described in the embodiments of this application is not limited to a Long Term Evolution (LTE)/LTE-Advanced (LTE-A) system, and may also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The described technologies can be applied to both the systems and the radio technologies mentioned above as well as to other systems and radio technologies. However, in the following descriptions, a New Radio (NR) system is described for an illustration purpose, and NR terms are used in most of the following descriptions, although these technologies may also be applied to other applications than an NR system application, such as a $6^{th}$ Generation (6G) communications system.

Figure 1:
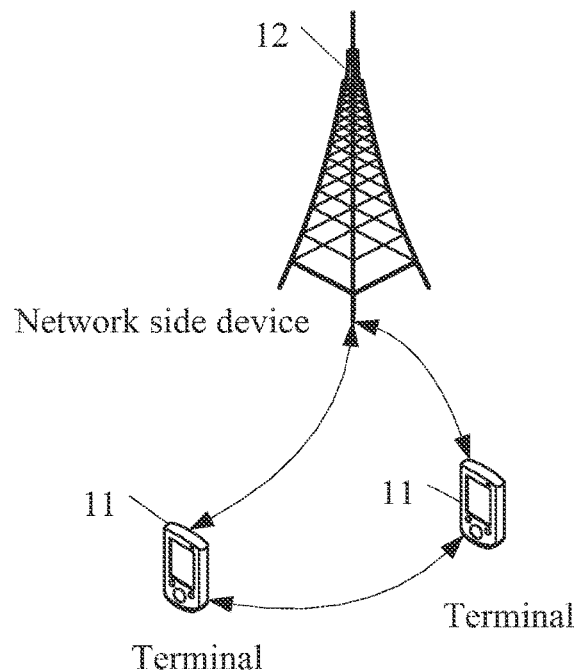
FIG. 1 is a structural diagram of a network system to which an embodiment of this application may be applied.

FIG. 1 is a block diagram of a wireless communications system to which embodiments of this application can be applied. The wireless communications system includes a terminal 11 and a network side device 12. The terminal 11 may also be referred to as a terminal device or UE. The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes a bracelet, a headset, glasses, and the like. It should be noted that a specific type of the terminal 11 is not limited in the embodiments of this application. The network side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a WiFi node, a transmitting receiving point (TRP), or another appropriate term in the art. As long as the same technical effect is achieved, the base station is not limited to a specific technical term. It should be noted that the base station in the NR system is taken only as an example in the embodiments of this application, but a specific type of the base station is not limited.

To enable a person skilled in the art to better understand the embodiments of this application, the following descriptions are first provided.

1. Dual Connectivity (DC).

Double connectivity indicates providing resources of two network nodes (an access network element) for the UE. One of the two network nodes is referred to as a master node (MN), and the other network node is referred to as a Secondary node (SN). The Carrier Aggregation (CA) technology is used at each network node, that is, a series of service cells controlled by the node are configured for the UE, which is also referred to as a cell group. The cell group controlled by the MN is referred to as a Master Cell Group (MCG), and the cell group controlled by the SN is referred to as a Secondary Cell Group (SCG). Each cell group includes a Special Cell (SpCell) and a series of Secondary Cell (Scell). In the MCG, the special cell is referred to as a Primary Cell (PCell), and in the SCG, the special cell is referred to as a Primary Secondary Cell (PSCell). In one cell group, the SpCell uses a main carrier, while another secondary cell uses a secondary carrier, and resource scheduling in one cell group is carried out by the SpCell.

2. Conditional PSCell Change (CPC).

The conditional PSCell change is PSCell change in which the UE evaluates an execution condition and performs execution after the execution condition is met. The UE starts to evaluate the execution condition after receiving the CPC configuration. The UE stops evaluating the execution condition after change of the primary secondary cell is triggered.

The CPC configuration includes a configuration and an execution condition of the CPC candidate cell. The execution condition may include one or two trigger conditions. The UE releases all stored CPC configurations once the change process of the primary secondary cell is successfully finished.

With reference to the accompanying drawings, the method for configuring and obtaining secondary cell group information provided in embodiments of this application is described in detail below by using specific embodiments and application scenarios thereof.

Figure 2:
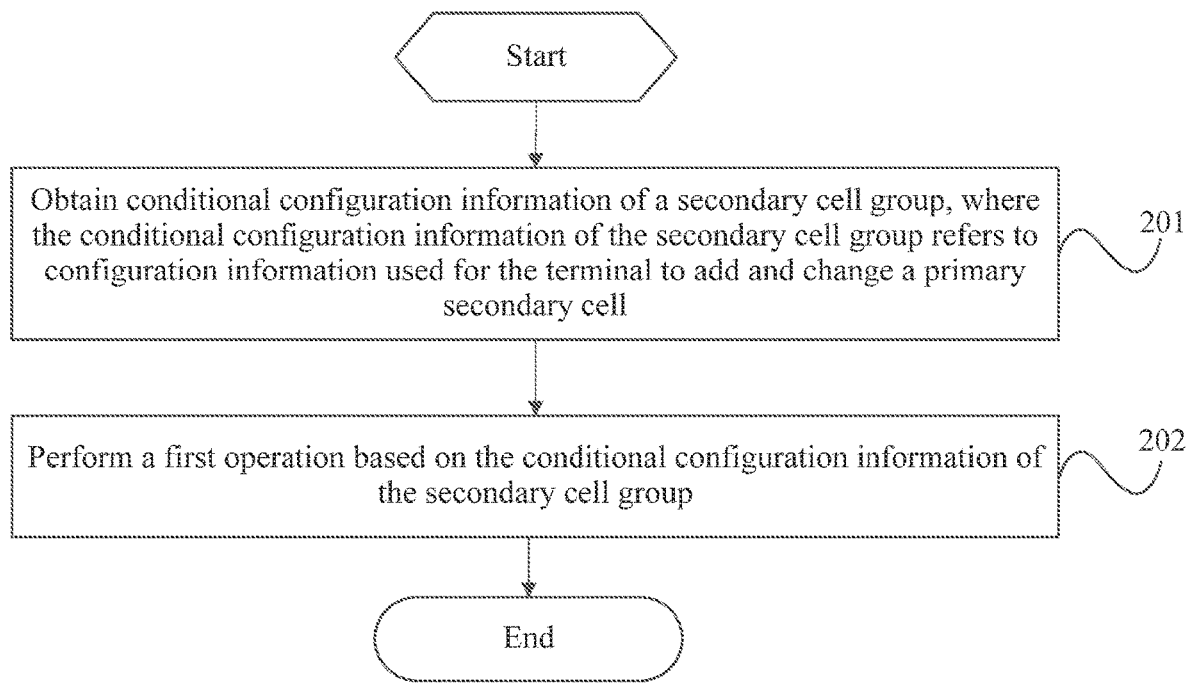
FIG. 2 is a schematic flowchart of a method for obtaining secondary cell group information according to an embodiment of this application.

As shown in FIG. 2, an embodiment of this application provides a method for obtaining secondary cell group information. The method is performed by a terminal and includes the following steps.

Step 201: Obtain conditional configuration information of a secondary cell group, where the conditional configuration information of the secondary cell group refers to configuration information used for the terminal to add and change a primary secondary cell.

In some embodiments, the conditional configuration information of the secondary cell group may be configuration information applicable to both adding the primary secondary cell and changing the primary secondary cell, or the conditional configuration information of the secondary cell group includes configuration information applicable to the terminal adding the primary secondary cell and configuration information applicable to the terminal changing the primary secondary cell.

Step 202: Perform a first operation based on the conditional configuration information of the secondary cell group.

The first operation includes an operation of adding the primary secondary cell, or the first operation includes the operation of adding the primary secondary cell and an operation of changing the primary secondary cell.

In this step, the terminal may evaluate, based on the conditional configuration information, whether one or more target cells of the secondary cell group meet the execution condition for adding the primary secondary cell, perform, when the execution condition for adding the primary secondary cell is met, the process of adding the primary secondary cell, continue to perform the evaluation of changing the primary secondary cell based on the conditional configuration information after finishing the process of adding the primary secondary cell, and perform, when the execution condition for changing the primary secondary cell is met, the process of changing the primary secondary cell.

According to the method for obtaining secondary cell group information in this embodiment of this application, the conditional configuration information of the secondary cell group refers to the configuration information used for the terminal to add and change the primary secondary cell, that is, the conditional configuration information is a condition configuration supporting both primary secondary cell adding and primary secondary cell change. Therefore, due to the conditional configuration information, the maintenance burden of frequently changing the secondary cell group information in the network can be reduced, the signaling load can be reduced, the delay of the UE in performing the process of adding the primary secondary cell and the process of changing the primary secondary cell can be reduced, and failures caused by rapid channel deterioration can be reduced.

In some embodiments, the conditional configuration information of the secondary cell group includes at least one of the following:
configuration information of at least one target cell;
configuration information of at least one execution condition for triggering adding and/or changing the primary secondary cell;
use range information corresponding to the at least one execution condition, where the use range information is used to indicate that the execution condition is used to trigger adding and/or changing the primary secondary cell. For example, the use range information is being applicable to CPA and/or CPC;
neighboring relationship information corresponding to at least one target cell; or
conditional PSCell change (CPC) indication information corresponding to at least one target cell, where the CPC indication information is used to indicate whether the target cell is a CPC candidate cell.

The target cell is a cell in the secondary cell group.

Further, in some embodiments, the configuration information of the execution condition for triggering adding and/or changing the primary secondary cell includes at least one of the following:
configuration information of an execution condition applicable to conditional PSCell adding (CPA) and CPC. For example, a measurement result of the target cell is greater than or equal to a preset threshold, and the preset threshold is applicable to CPA and CPC;
configuration information of at least one execution condition applicable to CPA; or
configuration information of at least one execution condition applicable to CPC.

Further, in some embodiments, the neighboring relationship information corresponding to the target cell includes at least one of the following:
neighboring cell information, where the neighboring cell information includes a neighboring cell of the at least one target cell;
a plurality of cells supporting CPC for each other;
a primary secondary cell that can be supported when the target cell is used as the CPC candidate cell; or
a CPC candidate cell that can be supported after the target cell is used as the primary secondary cell.

The CPC indication information includes at least one of the following:
an indication that the target cell can be used as the CPC candidate cell, where the indication may be a Boolean value or a bit;
cell information related to CPC, where the cell information related to CPC is used to indicate that CPC is supported among a plurality of cells;
cell information of the primary secondary cell that is supported when the target cell is used as the CPC candidate cell; or
cell information of the CPC candidate cell that is supported after the target cell is used as the primary secondary cell.

In some embodiments, the cell information is a bitmap corresponding to an index value of a cell; or
the cell information is an index value sequence corresponding to an index value of a cell; or
the cell information is a sequence including a cell identifier (ID).

An index herein in the bitmap or the index value sequence is corresponding to a configuration order of the cell, or is corresponding to a conditional configuration order.

Further, in some embodiments, the configuration information of the target cell includes at least one of the following:
identification information of a cell;

random access information;
channel configuration information;
a cell-radio network temporary identifier (C-RNTI); or
validity information of the configuration information, where the validity information includes at least one item applicable to CPA and CPC.

In some embodiments, the first operation includes the operation of adding the primary secondary cell and an operation of changing the primary secondary cell; and the performing a first operation based on the conditional configuration information of the secondary cell group includes:
the performing a first operation based on the conditional configuration information of the secondary cell group includes:
evaluating a first execution condition based on the conditional configuration information of the secondary cell group;
performing a process of adding the primary secondary cell in a case that the first execution condition is met;
evaluating a second execution condition based on the conditional configuration information of the secondary cell group after the process of adding the primary secondary cell is finished; and
performing a process of changing the primary secondary cell in a case that the second execution condition is met, where
the first execution condition refers to an execution condition applicable to CPA, or the first execution condition refers to an execution condition applicable to CPA and CPC;
the second execution condition refers to an execution condition applicable to CPC, or the second execution condition refers to an execution condition applicable to CPA and CPC; and
the first execution condition is the same as or different from the second execution condition.

In other words, in this embodiment of this application, the process of adding the primary secondary cell and the process of changing the primary secondary cell may be performed based on a same execution condition applicable to CPA and CPC. The process of adding the primary secondary cell may be performed based on the execution condition applicable to CPA, and the process of changing the primary secondary cell is performed based on the execution condition applicable to CPC.

In some embodiments, after the process of adding the primary secondary cell is performed, the method further includes:
maintaining configuration information related to CPC in the conditional configuration information of the secondary cell group.

Further, in some embodiments, the configuration information related to CPC in the conditional configuration information of the secondary cell group includes:
configuration information related to a CPC candidate cell; and
configuration information of an execution condition applicable to CPC.

For example, the configuration information related to the CPC candidate cell includes at least one of the following:
a cell corresponding to a neighboring cell of a current PSCell;
a cell configured with an execution condition applicable to CPC and/or conditional PSCell adding and change (CPAC);
a cell supporting the current PSCell in CPC indication information when the cell is used as the CPC candidate cell; or
a CPC candidate cell indicated in CPC indication information of the current PSCell.

The method for obtaining secondary cell group information is described below with reference to specific embodiments.

Embodiment 1

1. UE receives a Radio Resource Control (RRC) reconfiguration message. The RRC reconfiguration message includes conditional configuration information of a secondary cell group, which is referred to as a CPAC configuration without loss of generality.

The CPAC configuration includes a configuration and an execution condition of one or more CPAC candidate cells.

The CPAC configuration includes at least one of the following:
one or more trigger conditions applicable to CPA and/or CPC;
a neighboring relationship; or
CPC indication information.

In some embodiments, the CPC indication information may be cell information of a CPC candidate cell supported by a target cell after becoming a primary secondary cell, and the cell information may be a bitmap that is obtained based on an index value of the CPC candidate cell and that is in the conditional configuration information.

2. The UE starts to evaluate a CPA and/or CPAC execution condition. The CPAC execution condition is applicable to both CPA and CPC.
3. After a CPA execution condition is met, the UE performs a CPA process and adds the primary secondary cell.
4. After finishing the CPA process, the UE reserves a configuration of the CPC candidate cell corresponding to the PSCell in the CPAC configuration.
5. The UE starts to evaluate a CPC and/or CPAC execution condition.
6. After a CPC execution condition is met, the UE performs a CPC process and changes the primary secondary cell.

Embodiment 2

1. UE receives an RRC reconfiguration message. The RRC reconfiguration message includes conditional configuration information of a secondary cell group, which is referred to as a CPAC configuration without loss of generality.

The CPAC configuration includes a configuration and an execution condition of one or more CPAC candidate cells.

The configuration of the CPAC candidate cell includes one or more of the following:
identification information of a cell;
random access information;
a channel configuration;
C-RNTI; and
configured validity information.

The configured validity information includes: being applicable to CPA, CPC, or CPAC. CPAC indicates supporting CPA and CPC.

2. After a CPA execution condition is met, the UE performs a CPA process and adds the primary secondary cell.

3. The UE uses a C-RNTI that is included in the cell configuration corresponding to the current PSCell and that is in the CPAC configuration.
4. After finishing the CPA process, the UE reserves a CPC candidate cell in the CPAC configuration.
5. The UE evaluates a CPC and/or CPAC execution condition.
6. After a CPC execution condition is met, the UE performs a CPC process and changes the primary secondary cell.
7. The UE uses a C-RNTI that is included in a configuration corresponding to a target cell and that is in the CPAC configuration.

Figure 3:
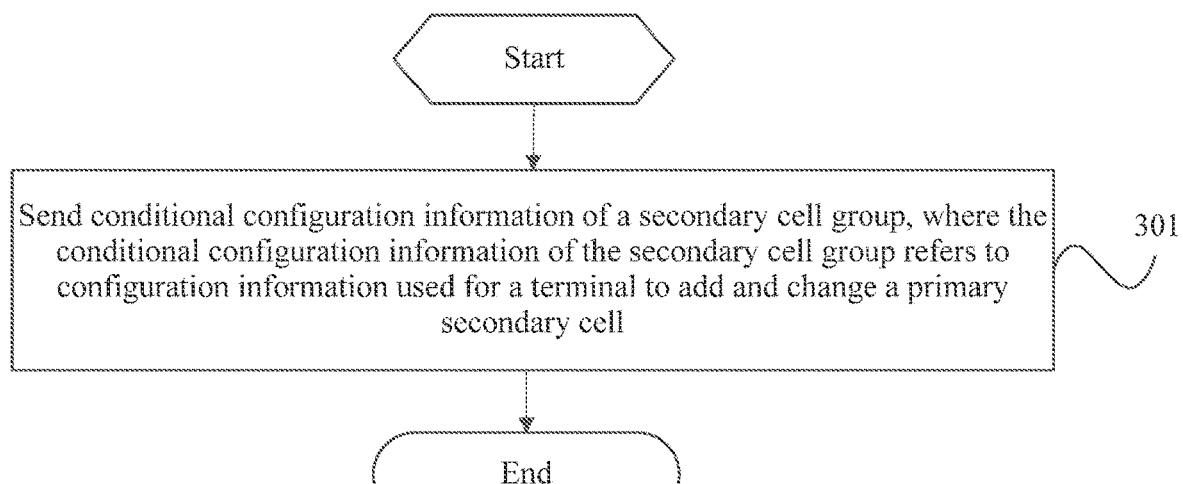
FIG. 3 is a schematic flowchart of a method for configuring secondary cell group information according to an embodiment of this application.

As shown in FIG. 3, an embodiment of this application provides a method for configuring secondary cell group information. The method is performed by a network side device and includes the following steps.

Step 301: Send conditional configuration information of a secondary cell group, where the conditional configuration information of the secondary cell group refers to configuration information used for the terminal to add and change a primary secondary cell.

In some embodiments, the conditional configuration information of the secondary cell group may be configuration information applicable to both adding the primary secondary cell and changing the primary secondary cell, or the conditional configuration information of the secondary cell group includes configuration information applicable to the terminal adding the primary secondary cell and configuration information applicable to the terminal changing the primary secondary cell.

According to the method for configuring the secondary cell group information in this embodiment of this application, the conditional configuration information of the secondary cell group refers to the configuration information used for the terminal to add and change the primary secondary cell, that is, the conditional configuration information is a condition configuration supporting both primary secondary cell adding and primary secondary cell change. Therefore, due to the conditional configuration information, the maintenance burden of frequently changing the secondary cell group information in the network can be reduced, the signaling load can be reduced, the delay of the UE in performing the process of adding the primary secondary cell and the process of changing the primary secondary cell can be reduced, and failures caused by rapid channel deterioration can be reduced.

In some embodiments, the conditional configuration information of the secondary cell group includes at least one of the following:
configuration information of the at least one target cell;
configuration information of at least one execution condition for triggering adding and/or changing the primary secondary cell;
use range information corresponding to the at least one execution condition, where the use range information is used to indicate that the execution condition is used to trigger adding and/or changing the primary secondary cell;
neighboring relationship information corresponding to the at least one target cell, or
conditional PSCell change (CPC) indication information corresponding to the at least one target cell, where the CPC indication information is used to indicate whether the target cell is a CPC candidate cell.

Further, in some embodiments, the configuration information of the execution condition for triggering adding and/or changing the primary secondary cell includes at least one of the following:
configuration information of an execution condition applicable to conditional PSCell adding (CPA) and CPC;
configuration information of at least one execution condition applicable to CPA; or
configuration information of at least one execution condition applicable to CPC.

Further, in some embodiments, the neighboring relationship information corresponding to the target cell includes at least one of the following:
neighboring cell information, where the neighboring cell information includes a neighboring cell of the at least one target cell;
a plurality of cells supporting CPC for each other;
a primary secondary cell that can be supported when the target cell is used as the CPC candidate cell; or
a CPC candidate cell that can be supported after the target cell is used as the primary secondary cell.

In some embodiments, the CPC indication information includes at least one of the following:
an indication that the target cell can be used as the CPC candidate cell;
cell information related to CPC, where the cell information related to CPC is used to indicate that CPC is supported among a plurality of cells;
cell information of the primary secondary cell that is supported when the target cell is used as the CPC candidate cell; or
cell information of the CPC candidate cell that is supported after the target cell is used as the primary secondary cell.

The cell information is a bitmap corresponding to an index value of a cell; or
the cell information is an index value sequence corresponding to an index value of a cell; or
the cell information is a sequence including a cell ID.

An index herein in the bitmap or the index value sequence is corresponding to a configuration order of the cell, or is corresponding to a conditional configuration order.

Further, in some embodiments, the configuration information of the target cell includes at least one of the following:
identification information of a cell;
random access information;
channel configuration information;
a cell-radio network temporary identifier (C-RNTI); or
validity information of the configuration information, where the validity information includes at least one item applicable to CPA and CPC.

According to the method for configuring the secondary cell group information in this embodiment of this application, the conditional configuration information of the secondary cell group refers to the configuration information used for the terminal to add and change the primary secondary cell, that is, the conditional configuration information is a condition configuration supporting both primary secondary cell adding and primary secondary cell change. Therefore, due to the conditional configuration information, the maintenance burden of frequently changing the secondary cell group information in the network can be reduced, the signaling load can be reduced, the delay of the UE in performing the process of adding the primary secondary cell and the process of changing the primary secondary cell can be reduced, and failures caused by rapid channel deterioration can be reduced.

It should be noted that, the method for obtaining secondary cell group information provided in this embodiment of this application may be performed by an apparatus for obtaining secondary cell group information, or by a control module that is in the apparatus for obtaining secondary cell group information and that is configured to perform the method for obtaining secondary cell group information. In this embodiment of this application, that the apparatus for obtaining secondary cell group information performs the method for obtaining secondary cell group information is used as an example to describe an apparatus for obtaining secondary cell group information provided in an embodiment of this application.

Figure 4:
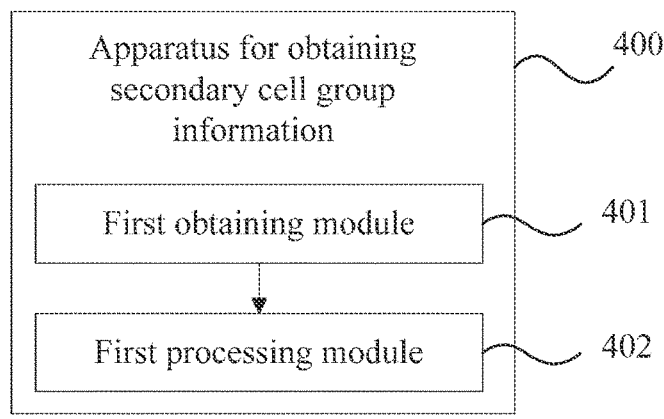
FIG. 4 is a schematic diagram of a module of an apparatus for obtaining secondary cell group information according to an embodiment of this application.

As shown in FIG. 4, an embodiment of this application provides an apparatus 400 for obtaining secondary cell group information. The apparatus is applied to a terminal, and includes:
- a first obtaining module 401, configured to obtain conditional configuration information of a secondary cell group, where the conditional configuration information of the secondary cell group refers to configuration information used for a terminal to add and change a primary secondary cell; and
- a first processing module 402, configured to perform a first operation based on the conditional configuration information of the secondary cell group, where
- the first operation includes an operation of adding the primary secondary cell, or the first operation includes the operation of adding the primary secondary cell and an operation of changing the primary secondary cell.

According to the apparatus for obtaining secondary cell group information in this embodiment of this application, the conditional configuration information of the secondary cell group includes at least one of the following:
- configuration information of the at least one target cell;
- configuration information of at least one execution condition for triggering adding and/or changing the primary secondary cell;
- use range information corresponding to the at least one execution condition, where the use range information is used to indicate that the execution condition is used to trigger adding and/or changing the primary secondary cell;
- neighboring relationship information corresponding to the at least one target cell; or
- conditional PSCell change (CPC) indication information corresponding to the at least one target cell, where the CPC indication information is used to indicate whether the target cell is a CPC candidate cell.

According to the apparatus for obtaining secondary cell group information in this embodiment of this application, the configuration information of the execution condition for triggering adding and/or changing the primary secondary cell includes at least one of the following:
- configuration information of an execution condition applicable to conditional PSCell adding (CPA) and CPC;
- configuration information of at least one execution condition applicable to CPA; or
- configuration information of at least one execution condition applicable to CPC.

According to the apparatus for obtaining secondary cell group information in this embodiment of this application, the neighboring relationship information corresponding to the target cell includes at least one of the following:
- neighboring cell information, where the neighboring cell information includes a neighboring cell of the at least one target cell;
- a plurality of cells supporting CPC for each other;
- a primary secondary cell that can be supported when the target cell is used as the CPC candidate cell; or
- a CPC candidate cell that can be supported after the target cell is used as the primary secondary cell.

According to the apparatus for obtaining secondary cell group information in this embodiment of this application, the CPC indication information includes at least one of the following:
- an indication that the target cell can be used as the CPC candidate cell;
- cell information related to CPC, where the cell information related to CPC is used to indicate that CPC is supported among a plurality of cells;
- cell information of the primary secondary cell that is supported when the target cell is used as the CPC candidate cell; or
- cell information of the CPC candidate cell that is supported after the target cell is used as the primary secondary cell.

According to the apparatus for obtaining secondary cell group information in this embodiment of this application, the cell information is a bitmap corresponding to an index value of a cell; or
the cell information is an index value sequence corresponding to an index value of a cell; or
the cell information is a sequence including a cell ID.

According to the apparatus for obtaining secondary cell group information in this embodiment of this application, the configuration information of the target cell includes at least one of the following:
- identification information of a cell;
- random access information;
- channel configuration information;
- a cell-radio network temporary identifier (C-RNTI); or
- validity information of the configuration information, where the validity information includes at least one item applicable to CPA and CPC.

According to the apparatus for obtaining secondary cell group information in this embodiment of this application, the first operation includes the operation of adding the primary secondary cell and the operation of changing the primary secondary cell; and
the first processing module includes:
- a first evaluating submodule, configured to evaluate a first execution condition based on the conditional configuration information of the secondary cell group;
- a first processing submodule, configured to perform a process of adding the primary secondary cell in a case that the first execution condition is met;
- a second evaluating submodule, configured to evaluate a second execution condition based on the conditional configuration information of the secondary cell group after the process of adding the primary secondary cell is finished; and
- a second processing submodule, configured to perform a process of changing the primary secondary cell in a case that the second execution condition is met, where
the first execution condition refers to an execution condition applicable to CPA, or the first execution condition refers to an execution condition applicable to CPA and CPC;

the second execution condition refers to an execution condition applicable to CPC, or the second execution condition refers to an execution condition applicable to CPA and CPC; and the first execution condition is the same as or different from the second execution condition.

The apparatus for obtaining secondary cell group information in this embodiment of this application further includes:

a maintaining module, configured for the first processing submodule to maintain configuration information related to CPC in the conditional configuration information of the secondary cell group after the process of adding the primary secondary cell is performed.

According to the apparatus for obtaining secondary cell group information in this embodiment of this application, the configuration information related to CPC in the conditional configuration information of the secondary cell group includes:

configuration information related to a CPC candidate cell; and configuration information of an execution condition applicable to CPC.

According to the apparatus for obtaining secondary cell group information in this embodiment of this application, the conditional configuration information of the secondary cell group refers to the configuration information used for the terminal to add and change the primary secondary cell, that is, the conditional configuration information is a condition configuration supporting both primary secondary cell adding and primary secondary cell change. Therefore, due to the conditional configuration information, the maintenance burden of frequently changing the secondary cell group information in the network can be reduced, the signaling load can be reduced, the delay of the UE in performing the process of adding the primary secondary cell and the process of changing the primary secondary cell can be reduced, and failures caused by rapid channel deterioration can be reduced.

The apparatus for obtaining secondary cell group information in this embodiment of this application may be an apparatus, or may be a component, an integrated circuit, or a chip in a terminal. The apparatus may be a mobile terminal or a non-mobile terminal. For example, the mobile terminal may include, but is not limited to, a type of the terminal 11 listed above. The non-mobile terminal may be a server, a Network Attached Storage (NAS), a personal computer (PC), a television (TV), a teller machine, or a self-service machine. This is not specifically limited in this embodiment of this application.

The apparatus for obtaining secondary cell group information in this embodiment of this application may be an apparatus with an operating system. The operating system may be an Android operating system, may be an iOS operating system, or may be another possible operating system, which is not specifically limited in the embodiments of this application.

The apparatus for obtaining secondary cell group information provided in this embodiment of this application can implement each process implemented in the method embodiment of FIG. 2, and a same technical effect is achieved. To avoid repetition, details are not described herein again.

Figure 5:
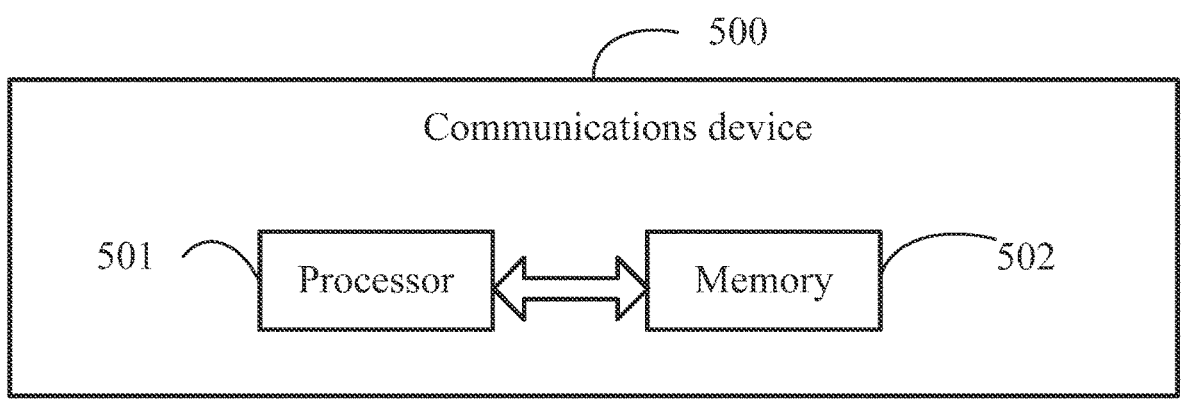
FIG. 5 is a structural block diagram of a communications device according to an embodiment of this application.

In some embodiments, as shown in FIG. 5, an embodiment of this application further provides a communications device 500, including a processor 501, a memory 502, a program or an instruction stored in the memory 502 and executable on the processor 501. For example, when the communications device 500 is a terminal, the program or the instruction is executed by the processor 501 to implement processes of the embodiment of the method for obtaining secondary cell group information applied to the terminal, and a same technical effect can be achieved. When the communications device 500 is a network side device, the program or the instruction is executed by the processor 501 to implement processes of the embodiment of the method for configuring secondary cell group information applied to the network side device, and a same technical effect can be achieved. To avoid repetition, details are not described herein again.

Figure 6:
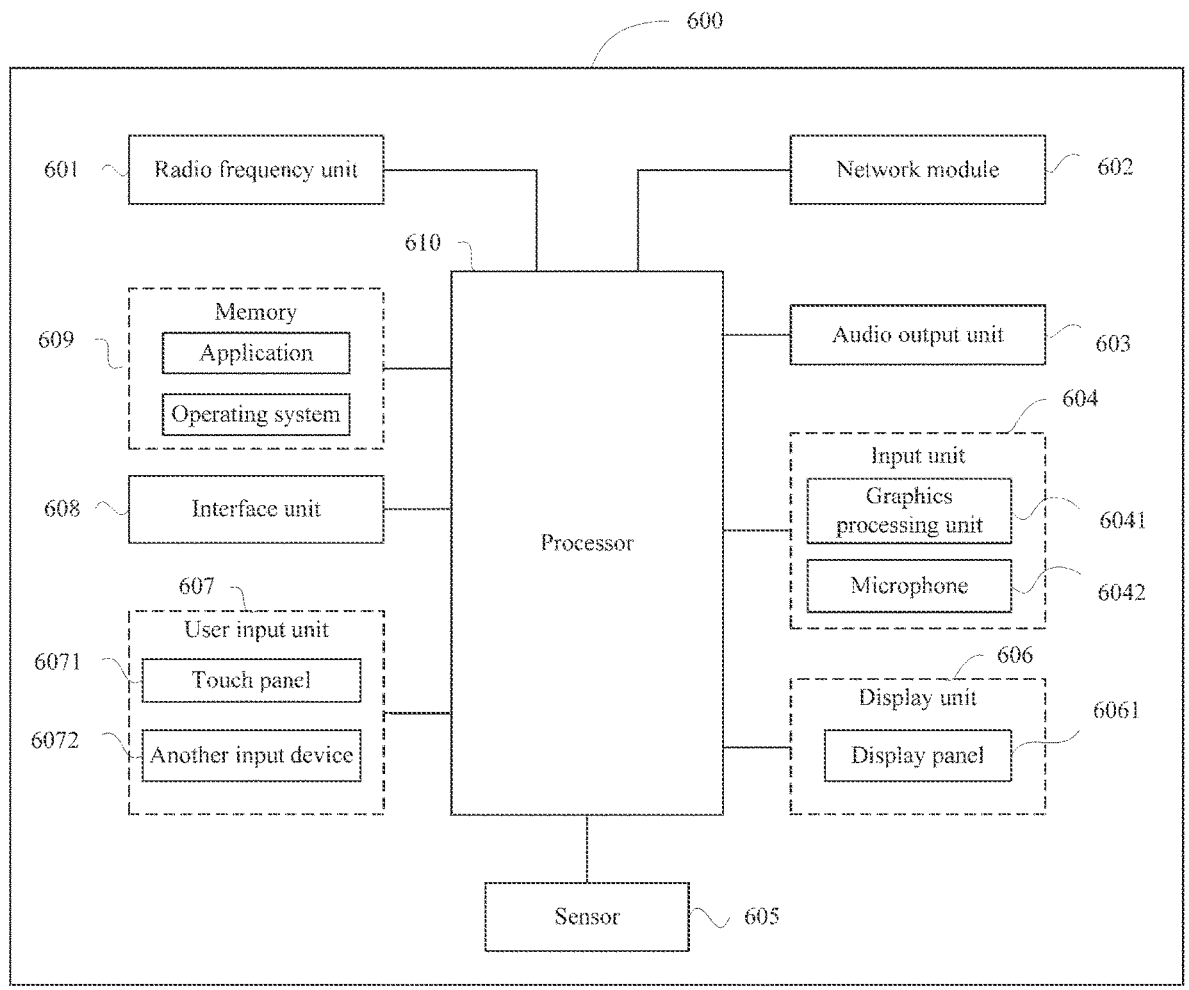
FIG. 6 is a structural block diagram of a terminal according to an embodiment of this application.

FIG. 6 is a schematic diagram of a hardware structure of a terminal for implementing embodiments of this application. The terminal 600 includes but is not limited to components such as a radio frequency unit 601, a network module 602, an audio output unit 603, an input unit 604, a sensor 605, a display unit 606, a user input unit 607, an interface unit 608, a memory 609, and a processor 610.

A person skilled in the art can understand that the terminal 600 may further include a power supply (such as a battery) that supplies power to each component. The power supply may be logically connected to the processor 610 by using a power supply management system, to implement functions such as charging and discharging management, and power consumption management by using the power supply management system. The terminal structure shown in FIG. 6 constitutes no limitation on the terminal, and the terminal may include more or fewer components than those shown in the figure, or combine some components, or have different component arrangements. Details are not described herein.

It should be understood that, in the embodiments of this application, the input unit 604 may include a Graphics Processing Unit (GPU) 6041 and a microphone 6042, and the graphics processing unit 6041 processes image data of a still picture or video obtained by an image capture apparatus (such as a camera) in a video capture mode or an image capture mode. The display unit 606 may include a display panel 6061, and the display panel 6061 may be configured in a form of a liquid crystal display, an organic light emitting diode, or the like. The user input unit 607 includes a touch panel 6071 and another input device 6072. The touch panel 6071 is also referred to as a touchscreen. The touch panel 6071 may include two parts: a touch detection apparatus and a touch controller. The another input device 6072 may include but is not limited to a physical keyboard, a functional button (such as a volume control button or a power on/off button), a trackball, a mouse, and a joystick. Details are not described herein.

In this embodiment of this application, the radio frequency unit 601 receives downlink data from a network side device and then sends the downlink data to the processor 610 for processing; and sends uplink data to the network side device. Usually, the radio frequency unit 601 includes but is not limited to an antenna, at least one amplifier, a transceiver, a coupler, a low noise amplifier, a duplexer, and the like.

The memory 609 may be configured to store a software program or an instruction and various pieces of data. The memory 609 may mainly include a program or instruction storage area and a data storage area. The program or instruction storage area may store an operating system, and an application or an instruction required by at least one function (for example, a sound playing function or an image playing function). In addition, the memory 609 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage component, a flash memory component, or another non-volatile solid-state storage component.

The processor 610 may include one or more processing units. In some embodiments, an application processor and a modem processor may be integrated into the processor 610. The application processor mainly processes an operating system, a user interface, an application, an instruction, or the like. The modem processor mainly processes wireless communications, for example, a baseband processor. It can be understood that, the modem processor may not be integrated into the processor 610.

The radio frequency unit 601 is configured to obtain conditional configuration information of a secondary cell group, where the conditional configuration information of the secondary cell group refers to configuration information used for the terminal to add and change a primary secondary cell; and the processor 610 is configured to perform a first operation based on the conditional configuration information of the secondary cell group, where the first operation includes an operation of adding the primary secondary cell, or the first operation includes the operation of adding the primary secondary cell and an operation of changing the primary secondary cell.

According to the terminal in this embodiment of this application, the conditional configuration information of the secondary cell group refers to the configuration information used for the terminal to add and change the primary secondary cell, that is, the conditional configuration information is a condition configuration supporting both primary secondary cell adding and primary secondary cell change. Therefore, due to the conditional configuration information, the maintenance burden of frequently changing the secondary cell group information in the network can be reduced, the signaling load can be reduced, the delay of the UE in performing the process of adding the primary secondary cell and the process of changing the primary secondary cell can be reduced, and failures caused by rapid channel deterioration can be reduced.

In some embodiments, the conditional configuration information of the secondary cell group includes at least one of the following:
configuration information of the at least one target cell;
configuration information of at least one execution condition for triggering adding and/or changing the primary secondary cell;
use range information corresponding to the at least one execution condition, where the use range information is used to indicate that the execution condition is used to trigger adding and/or changing the primary secondary cell;
neighboring relationship information corresponding to the at least one target cell; or
conditional PSCell change (CPC) indication information corresponding to the at least one target cell, where the CPC indication information is used to indicate whether the target cell is a CPC candidate cell.

In some embodiments, the configuration information of the execution condition for triggering adding and/or changing the primary secondary cell includes at least one of the following:

configuration information of an execution condition applicable to conditional PSCell adding (CPA) and CPC;
configuration information of at least one execution condition applicable to CPA; or
configuration information of at least one execution condition applicable to CPC.

In some embodiments, the neighboring relationship information corresponding to the target cell includes at least one of the following:
neighboring cell information, where the neighboring cell information includes a neighboring cell of the at least one target cell:
a plurality of cells supporting CPC for each other;
a primary secondary cell that can be supported when the target cell is used as the CPC candidate cell; or
a CPC candidate cell that can be supported after the target cell is used as the primary secondary cell.

In some embodiments, the CPC indication information includes at least one of the following:
an indication that the target cell can be used as the CPC candidate cell;
cell information related to CPC, where the cell information related to CPC is used to indicate that CPC is supported among a plurality of cells;
cell information of the primary secondary cell that is supported when the target cell is used as the CPC candidate cell; or
cell information of the CPC candidate cell that is supported after the target cell is used as the primary secondary cell.

In some embodiments, the cell information is a bitmap corresponding to an index value of a cell; or
the cell information is an index value sequence corresponding to an index value of a cell; or
the cell information is a sequence including a cell ID.

In some embodiments, the configuration information of the target cell includes at least one of the following:
identification information of a cell;
random access information;
channel configuration information;
a cell-radio network temporary identifier (C-RNTI); or
validity information of the configuration information, where the validity information includes at least one item applicable to CPA and CPC.

In some embodiments, the first operation includes the operation of adding the primary secondary cell and an operation of changing the primary secondary cell; and
the processor 610 is configured to: evaluate a first execution condition based on the conditional configuration information of the secondary cell group;
perform a process of adding the primary secondary cell in a case that the first execution condition is met;
evaluate a second execution condition based on the conditional configuration information of the secondary cell group after the process of adding the primary secondary cell is finished; and
perform a process of changing the primary secondary cell in a case that the second execution condition is met, where
the first execution condition refers to an execution condition applicable to CPA, or the first execution condition refers to an execution condition applicable to CPA and CPC;

the second execution condition refers to an execution condition applicable to CPC, or the second execution condition refers to an execution condition applicable to CPA and CPC; and the first execution condition is the same as or different from the second execution condition.

In some embodiments, the processor 610 is further configured to maintain configuration information related to CPC in the conditional configuration information of the secondary cell group.

In some embodiments, the configuration information related to CPC in the conditional configuration information of the secondary cell group includes:

configuration information related to a CPC candidate cell; and configuration information of an execution condition applicable to CPC.

According to the terminal in this embodiment of this application, the conditional configuration information of the secondary cell group refers to the configuration information used for the terminal to add and change the primary secondary cell, that is, the conditional configuration information is a condition configuration supporting both primary secondary cell adding and primary secondary cell change. Therefore, due to the conditional configuration information, the maintenance burden of frequently changing the secondary cell group information in the network can be reduced, the signaling load can be reduced, the delay of the UE in performing the process of adding the primary secondary cell and the process of changing the primary secondary cell can be reduced, and failures caused by rapid channel deterioration can be reduced.

Figure 7:
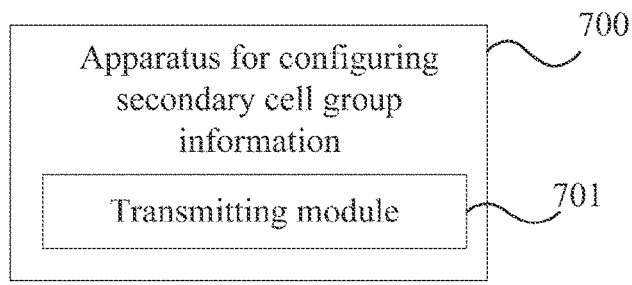
FIG. 7 is a schematic diagram of a module of an apparatus for configuring secondary cell group information according to an embodiment of this application.

As shown in FIG. 7, an embodiment of this application further provides an apparatus 700 for configuring secondary cell group information, including:

a transmitting module 701, configured to send conditional configuration information of a secondary cell group, where the conditional configuration information of the secondary cell group refers to configuration information used for a terminal to add and change a primary secondary cell.

According to the apparatus for configuring secondary cell group information in this embodiment of this application, the conditional configuration information of the secondary cell group includes at least one of the following:

configuration information of the at least one target cell;

configuration information of at least one execution condition for triggering adding and/or changing the primary secondary cell;

use range information corresponding to the at least one execution condition, where the use range information is used to indicate that the execution condition is used to trigger adding and/or changing the primary secondary cell;

neighboring relationship information corresponding to the at least one target cell; or conditional PSCell change (CPC) indication information corresponding to the at least one target cell, where the CPC indication information is used to indicate whether the target cell is a CPC candidate cell.

According to the apparatus for configuring secondary cell group information in this embodiment of this application, the configuration information of the execution condition for triggering adding and/or changing the primary secondary cell includes at least one of the following:

configuration information of an execution condition applicable to conditional PSCell adding (CPA) and CPC;

configuration information of at least one execution condition applicable to CPA; or configuration information of at least one execution condition applicable to CPC.

According to the apparatus for configuring secondary cell group information in this embodiment of this application, the neighboring relationship information corresponding to the target cell includes at least one of the following:

neighboring cell information, where the neighboring cell information includes a neighboring cell of the at least one target cell;

a plurality of cells supporting CPC for each other;

a primary secondary cell that can be supported when the target cell is used as the CPC candidate cell; or a CPC candidate cell that can be supported after the target cell is used as the primary secondary cell.

According to the apparatus for configuring secondary cell group information in this embodiment of this application, the CPC indication information includes at least one of the following:

an indication that the target cell can be used as the CPC candidate cell;

cell information related to CPC, where the cell information related to CPC is used to indicate that CPC is supported among a plurality of cells;

cell information of the primary secondary cell that is supported when the target cell is used as the CPC candidate cell; or cell information of the CPC candidate cell that is supported after the target cell is used as the primary secondary cell.

According to the apparatus for configuring secondary cell group information in this embodiment of this application, the cell information is a bitmap corresponding to an index value of a cell; or the cell information is an index value sequence corresponding to an index value of a cell; or the cell information is a sequence including a cell ID.

According to the apparatus for configuring secondary cell group information in this embodiment of this application, the configuration information of the target cell includes at least one of the following:

identification information of a cell;

random access information;

channel configuration information;

a cell-radio network temporary identifier (C-RNTI); or validity information of the configuration information, where the validity information includes at least one item applicable to CPA and CPC.

According to the apparatus for configuring secondary cell group information in this embodiment of this application, the conditional configuration information of the secondary cell group refers to the configuration information used for the terminal to add and change the primary secondary cell, that is, the conditional configuration information is a condition configuration supporting both primary secondary cell adding and primary secondary cell change. Therefore, due to the conditional configuration information, the maintenance burden of frequently changing the secondary cell group information in the network can be reduced, the signaling load can be reduced, the delay of the UE in performing the process of adding the primary secondary cell and the process of changing the primary secondary cell can be reduced, and failures caused by rapid channel deterioration can be reduced.

Figure 8:
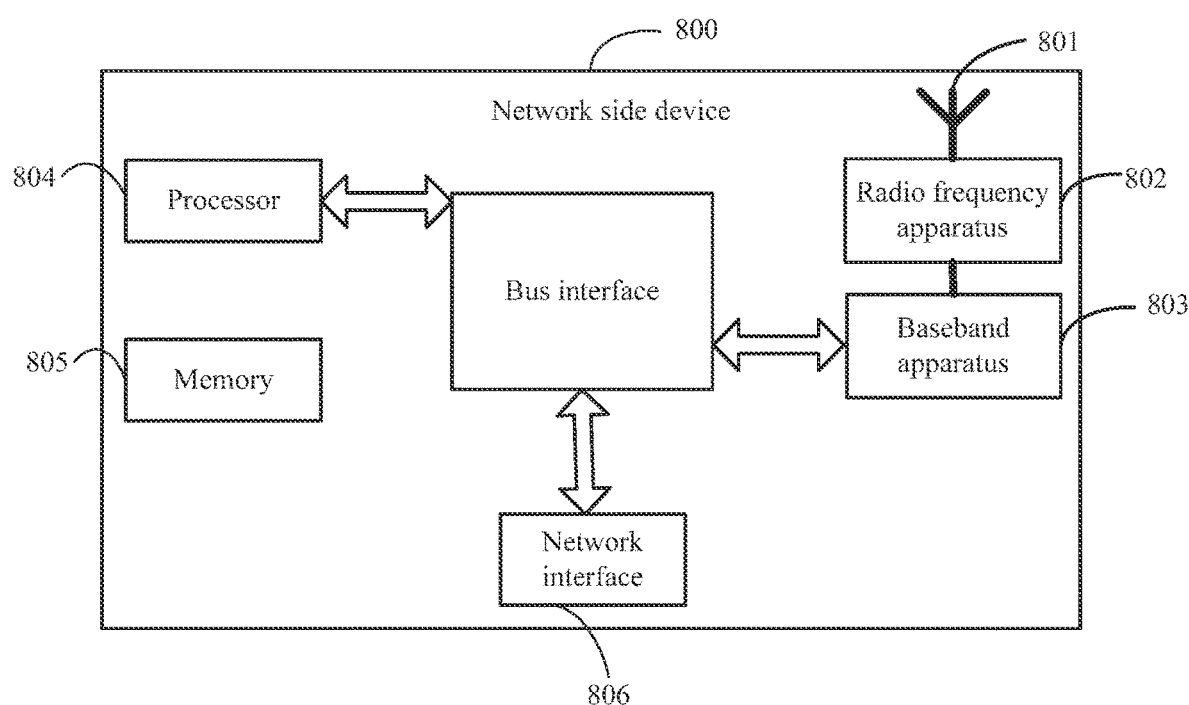
FIG. 8 is a structural block diagram of a network side device according to an embodiment of this application.

An embodiment of this application further provides a network side device. As shown in FIG. 8, the network side device 800 includes an antenna 801, a radio frequency apparatus 802, and a baseband apparatus 803. The antenna 801 is connected to the radio frequency apparatus 802. In an uplink direction, the radio frequency apparatus 802 receives information by using the antenna 801, and transmits the received information to the baseband apparatus 803 for processing. In a downlink direction, the baseband apparatus 803 processes information to be sent and sends the information to the radio frequency apparatus 802, and the radio frequency apparatus 802 processes the received information and sends the information through the antenna 901.

The foregoing band processing apparatus may be located in the baseband apparatus 803, and the method performed by the network side device in the foregoing embodiment may be implemented in the baseband apparatus 803. The baseband apparatus 803 includes a processor 804 and a memory 805.

The baseband apparatus 803 may include, for example, at least one baseband board, where a plurality of chips are disposed on the baseband board. As shown in FIG. 8, one chip is, for example, the processor 804, which is connected to the memory 805, so as to invoke a program in the memory 805 to perform operations of the network side device shown in the foregoing method embodiment.

The baseband apparatus 803 may further include a network interface 806, configured to exchange information with the radio frequency apparatus 802, where the interface is, for example, a common public radio interface (CPRI).

The network side device in this embodiment of the present disclosure further includes an instruction or a program stored in the memory 805 and executable on the processor 804. The processor 804 invokes the instruction or the program in the memory 805 to perform the method performed by the modules shown in FIG. 7, and a same technical effect is achieved. To avoid repetition, details are not provided herein again.

An embodiment of this application further provides a readable storage medium, where the readable storage medium stores a program or an instruction, and when the program or the instruction is executed by a processor, processes of the embodiment of the method for obtaining secondary cell group information or the method for configuring secondary cell group information are implemented, and a same technical effect can be achieved. To avoid repetition, details are not described herein again.

The processor is a processor in the terminal in the foregoing embodiment. The readable storage medium includes a computer-readable storage medium such as a Read-Only Memory (ROM), a Random Access Memory (RAM), a magnetic disk, an optical disc, or the like.

An embodiment of this application further provides a chip, where the chip includes a processor and a communications interface, the communications interface is coupled to the processor, and the processor is configured to run a program or an instruction to implement processes of the embodiment of the method for obtaining secondary cell group information or the method for configuring secondary cell group information, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the methods and apparatuses in the embodiments of this application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, a network device, or the like) to perform the methods described in the embodiments of this application.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

The invention claimed is:

1. A method for obtaining secondary cell group information, performed by a terminal, comprising:
   obtaining conditional configuration information of a secondary cell group, wherein the conditional configuration information of the secondary cell group comprises configuration information used for the terminal to add and change a primary secondary cell (PSCell); and
   performing a first operation based on the conditional configuration information of the secondary cell group, wherein the first operation comprises an operation of adding the primary secondary cell and an operation of changing the primary secondary cell,
   wherein performing the first operation based on the conditional configuration information of the secondary cell comprising:

evaluating a first execution condition based on the conditional configuration information of the secondary cell group:
  performing a process of adding the primary secondary cell when the first execution condition is met;
  evaluating a second execution condition based on the conditional configuration information of the secondary cell group after the process of adding the primary secondary cell is finished; and
  performing a process of changing the primary secondary cell when the second execution condition is met,
wherein the first execution condition is applicable to conditional PSCell adding (CPA), or the first execution condition is applicable to CPA and conditional PSCell change (CPC); and
wherein the second execution condition is applicable to CPC, or the second execution condition is applicable to CPA and CPC.

2. The method for obtaining secondary cell group information according to claim 1, wherein the conditional configuration information of the secondary cell group comprises at least one of the following:
  configuration information of at least one target cell;
  configuration information of at least one execution condition for triggering adding or changing the primary secondary cell;
  use range information corresponding to the at least one execution condition, wherein the use range information is used to indicate that the at least one execution condition is used to trigger adding or changing the primary secondary cell;
  neighboring relationship information corresponding to the at least one target cell; or
  conditional PSCell change (CPC) indication information corresponding to the at least one target cell, wherein the CPC indication information is used to indicate whether the at least one target cell is a CPC candidate cell.

3. The method for obtaining secondary cell group information according to claim 2, wherein the configuration information of the at least one execution condition for triggering adding or changing the primary secondary cell comprises at least one of the following:
  configuration information of an execution condition applicable to CPA and CPC;
  configuration information of the at least one execution condition applicable to CPA; or
  configuration information of the at least one execution condition applicable to CPC.

4. The method for obtaining secondary cell group information according to claim 2, wherein the neighboring relationship information corresponding to the at least one target cell comprises at least one of the following:
  neighboring cell information, wherein the neighboring cell information comprises a neighboring cell of the at least one target cell;
  a plurality of cells supporting CPC for each other;
  a primary secondary cell that is supported when the at least one target cell is used as the CPC candidate cell; or
  the CPC candidate cell that is supported after the at least one target cell is used as the primary secondary cell.

5. The method for obtaining secondary cell group information according to claim 2, wherein the CPC indication information comprises at least one of the following:
  an indication that the at least one target cell is used as the CPC candidate cell;
  cell information related to CPC, wherein the cell information related to CPC is used to indicate that CPC is supported among a plurality of cells;
  cell information of the primary secondary cell that is supported when the at least one target cell is used as the CPC candidate cell; or
  cell information of the CPC candidate cell that is supported after the at least one target cell is used as the primary secondary cell.

6. The method for obtaining secondary cell group information according to claim 5, wherein:
  the cell information is a bitmap corresponding to an index value of a cell;
  the cell information is an index value sequence corresponding to an index value of a cell; or
  the cell information is a sequence comprising a cell identifier (ID).

7. The method for obtaining secondary cell group information according to claim 2, wherein the configuration information of the at least one target cell comprises at least one of the following:
  identification information of a cell;
  random access information;
  channel configuration information;
  a cell-radio network temporary identifier (C-RNTI); or
  validity information of the configuration information, wherein the validity information comprises at least one item applicable to CPA and CPC.

8. The method for obtaining secondary cell group information according to claim 1, wherein
  the first execution condition is the same as or different from the second execution condition.

9. The method for obtaining secondary cell group information according to claim 1, wherein after performing the process of adding the primary secondary cell, the method further comprises:
  maintaining configuration information related to CPC in the conditional configuration information of the secondary cell group.

10. The method for obtaining secondary cell group information according to claim 9, wherein the configuration information related to CPC in the conditional configuration information of the secondary cell group comprises:
  configuration information related to a CPC candidate cell; and
  configuration information of an execution condition applicable to CPC.

11. A terminal, comprising:
  a memory storing a computer program; and
  a processor coupled to the memory and configured to execute the computer program to perform operations comprising:
    obtaining conditional configuration information of a secondary cell group, wherein the conditional configuration information of the secondary cell group comprises configuration information used for the terminal to add and change a primary secondary cell (PSCell); and
    performing a first operation based on the conditional configuration information of the secondary cell group,
  wherein the first operation comprises an operation of adding the primary secondary cell and an operation of changing the primary secondary cell,
  wherein performing the first operation based on the conditional configuration information of the secondary cell comprising:

evaluating a first execution condition based on the conditional configuration information of the secondary cell group;
performing a process of adding the primary secondary cell when the first execution condition is met;
evaluating a second execution condition based on the conditional configuration information of the secondary cell group after the process of adding the primary secondary cell is finished;
performing a process of changing the primary secondary cell when the second execution condition is met,
wherein the first execution condition is applicable to conditional PSCell adding (CPA). or the first execution condition is applicable to CPA and conditional PSCell change (CPC): and
wherein the second execution condition is applicable to CPC, or the second execution condition is applicable to CPA and CPC.

12. The terminal according to claim 11, wherein the conditional configuration information of the secondary cell group comprises at least one of the following:
configuration information of at least one target cell;
configuration information of at least one execution condition for triggering adding or changing the primary secondary cell;
use range information corresponding to the at least one execution condition, wherein the use range information is used to indicate that the at least one execution condition is used to trigger adding or changing the primary secondary cell;
neighboring relationship information corresponding to at least one target cell; or
conditional PSCell change (CPC) indication information corresponding to at least one target cell, wherein the CPC indication information is used to indicate whether the at least one target cell is a CPC candidate cell.

13. The terminal according to claim 12, wherein the configuration information of the execution condition for triggering adding or changing the primary secondary cell comprises at least one of the following:
configuration information of the at least one execution condition applicable to CPA and CPC;
configuration information of the at least one execution condition applicable to CPA; or
configuration information of the at least one execution condition applicable to CPC.

14. The terminal according to claim 12, wherein the neighboring relationship information corresponding to the at least one target cell comprises at least one of the following:
neighboring cell information, wherein the neighboring cell information comprises a neighboring cell of the at least one target cell;
a plurality of cells supporting CPC for each other;
a primary secondary cell that is supported when the at least one target cell is used as the CPC candidate cell; or
the CPC candidate cell that is supported after the at least one target cell is used as the primary secondary cell.

15. The terminal according to claim 12, wherein the CPC indication information comprises at least one of the following:
an indication that the at least one target cell is used as the CPC candidate cell;
cell information related to CPC, wherein the cell information related to CPC is used to indicate that CPC is supported among a plurality of cells;
cell information of the primary secondary cell that is supported when the at least one target cell is used as the CPC candidate cell; or
cell information of the CPC candidate cell that is supported after the at least one target cell is used as the primary secondary cell.

16. The terminal according to claim 15, wherein:
the cell information is a bitmap corresponding to an index value of a cell;
the cell information is an index value sequence corresponding to an index value of a cell; or
the cell information is a sequence comprising a cell identifier (ID).

17. The terminal according to claim 12, wherein the configuration information of the at least one target cell comprises at least one of the following:
identification information of a cell;
random access information;
channel configuration information;
a cell-radio network temporary identifier (C-RNTI); or0
validity information of the configuration information, wherein the validity information comprises at least one item applicable to CPA and CPC.

18. The terminal according to claim 11, wherein
the first execution condition is the same as or different from the second execution condition.

19. A non-transitory computer-readable storage medium, storing a computer program, wherein the computer program, when executed by a processor of a terminal, causes the processor to perform operations comprising:
obtaining conditional configuration information of a secondary cell group, wherein the conditional configuration information of the secondary cell group comprises configuration information used for the terminal to add and change a primary secondary cell (PSCell); and
performing a first operation based on the conditional configuration information of the secondary cell group,
wherein the first operation comprises an operation of adding the primary secondary cell and an operation of changing the primary secondary cell, and
wherein performing the first operation based on the conditional configuration information of the secondary cell comprising:
evaluating a first execution condition based on the conditional configuration information of the secondary cell group;
performing a process of adding the primary secondary cell when the first execution condition is met;
evaluating a second execution condition based on the conditional configuration information of the secondary cell group after the process of adding the primary secondary cell is finished; and
performing a process of changing the primary secondary cell when the second execution condition is met,
wherein the first execution condition is applicable to conditional PSCell adding (CPA), or the first execution condition is applicable to CPA and conditional PSCell change (CPC); and
wherein the second execution condition is applicable to CPC, or the second execution condition is applicable to CPA and CPC.

20. The non-transitory computer-readable storage medium according to claim 19, wherein the conditional configuration information of the secondary cell group comprises at least one of the following:
configuration information of at least one target cell;

configuration information of at least one execution condition for triggering adding or changing the primary secondary cell;

use range information corresponding to the at least one execution condition, wherein the use range information is used to indicate that the at least one execution condition is used to trigger adding or changing the primary secondary cell;

neighboring relationship information corresponding to at least one target cell; or conditional PSCell change (CPC) indication information corresponding to at least one target cell, wherein the CPC indication information is used to indicate whether the at least one target cell is a CPC candidate cell.

\* \* \* \* \*